United States Patent [19]

Wilson

[11] Patent Number: 4,551,401
[45] Date of Patent: Nov. 5, 1985

[54] METHOD OF SUPPRESSING LEAD DUST

[75] Inventor: Frank Wilson, Lancashire, England

[73] Assignee: Chloride, Inc., Tampa, Fla.

[21] Appl. No.: 600,140

[22] Filed: Apr. 13, 1984

[51] Int. Cl.[4] .................. H01M 6/00; H01M 2/16
[52] U.S. Cl. .................... 429/122; 429/126;
  429/137; 429/217; 252/88; 29/623.5
[58] Field of Search ............... 429/122, 126, 217, 137;
  252/88; 29/623.5

[56] References Cited

U.S. PATENT DOCUMENTS 4,135,041 1/1979 Jung et al. ............... 429/217 X
4,232,100 11/1980 Magnusson et al. ............ 429/137 X
4,434,067 2/1984 Malone et al. ................. 252/88

FOREIGN PATENT DOCUMENTS 0712435 1/1980 U.S.S.R. .

OTHER PUBLICATIONS

Chemical Abstracts: 92:7703, 94:17370, 94:158056.

Primary Examiner—Brian E. Hearn
Assistant Examiner—Stephen J. Kalafut
Attorney, Agent, or Firm—Frijouf, Rust & Pyle

[57] ABSTRACT

A method of suppressing lead dust generated in the manufacture of pasted lead acid storage battery plates by coating the surface of a pasted battery plate with a solution or a suspension comprising ammonium sulfate, copolymer and water. The resultant water insoluble film is made porous by the simultaneous evolution of ammonia gas produced during the coating process. The porous water insoluble film on the battery plate results in an electric storage battery with a lower internal resistance, than previously disclosed coatings and produces a battery with performance characteristics less inhibited than those made with previously disclosed coatings.

27 Claims, No Drawings

METHOD OF SUPPRESSING LEAD DUST

BACKGROUND OF THE INVENTION

1. Field of the Invention

The invention relates to the suppression of lead (Pb) dust generated during the manufacture of lead-acid batteries by coating pasted plates with a latex dispersion comprising ammonium sulfate $(NH_4)_2SO_4$, copolymer and water. The invention also contemplates the composition of the latex dispersion and the coated plates.

2. Prior Art

The manufacture of lead acid batteries involves numerous steps which generate lead dust. In manufacturing battery plates, a metallic grid is pasted by pressing lead oxide mixed with water and dilute sulfuric acid into the voids of the grids. The process is commonly referred to as pasting the battery plate. Thereafter, the pasted grid is flash dried, cured, formed (initially charged), washed and dried. The resultant grid or battery plate is assembled to form a battery. The danger of lead emission from the pasted grid is very high when the pasted grid is subjected to the flash drying process and then transported to subsequent work stations. During the drying process, moisture rises to the plate surface and vaporizes. This results in a thin film of dust on the surface of the pasted grid which is easily lost to the environment. The step usually considered to produce the largest amount of fine lead dust pollution resides between the flash drying of the battery plate and the strap burning procedure.

It is well known that lead compounds accumulate in human bodies and become toxic at a level at approximately 0.5 mg. of lead per day. Accordingly, the battery industry has made numerous efforts to improve the air quality standard for the well being of battery industry employees. Further many governmental and health agencies establish air quality standards and regulations for industries utilizing lead compounds. Heretofore, the battery industry has failed to provides economical method of reducing lead dust in a battery factory without substantially reducing the performance of the battery.

U.S. Pat. No. 3,905,829 issued to Weissman et al utilizes a water soluble polymeric coating which, when applied to a pasted battery grid plate, lowers the emission of lead dust. The water soluble polymers embraced are, for example, polyvinyl alcohol, polyethylene oxide, alkyl cellulose, acrylic resins and water soluble starches. The coating is less than one micron in thickness so that the coating adequately provides for the transmission of oxygen and water vapor for the curing process. This coating is only a temporary coating on an unformed plate since the coating is substantially washed out during the formation of the plate. The failure to affect battery performance was considered unexpected since the use of polymeric materials on a lead acid battery plate was expected to increase electrical resistance, thereby necessitating a larger battery to attain the same electrical output as an uncoated battery plate.

U.S. Pat. No. 4,197,368 issued to Davis et al discloses adding sodium silicate to the lead paste mix before the grids are pasted to reduce lead dust created by the handling of the plates.

U.S. Pat. No. 4,232,100 reduces lead dust by coating the plates with a water insoluble plastics material (styrene and acrylic acid ester) delivered in the form of a diluted 50 percent aqueous disperson. The thickness of the coating is limited since the electrical properties of the plate would be degraded by a thick coating.

The electrical permeability of the coating is important as recognized by prior art disclosures whose purpose is to protect the plates against the effects of charging and discharging, viz. shedding and treeing.

U.S. Pat. No. 756,176 discloses a protective sheath consisting of castor oil, essence of turpentine and nitrates of cellulose. The sheath is made porous either by chemical or mechanical means.

U.S. Pat. No. 2,673,230 relates to a protective porous sheath formed by depositing particles, e.g. polystyrene, polyethylene, and causing the particles to unite on heating of the battery plate. The disclosure cautions not to excessively heat the plate so that the particles become molten in order to retain the small spaces between the particles.

U.S. Pat. No. 2,810,775 utilizes a protective web impregnated with a solution of a thermosetting resin. The resultant web is permeable to the electrolyte of the storage battery.

Canadian Pat. No. 664,290 teaches a latex coating formed by copolymerizing vinylidene chloride with a minor amount of an alkyl acrylate. The resultant film is sufficiently porous to be permeable to the electrolyte and to permit the passage of gases formed in reactions at the battery plates. The purpose of the film is to prevent excess shedding of the plate paste during battery cycling.

As is evident, the prior art has failed to establish an economical yet highly effective method of lowering lead dust in the workplace while also retaining electrical performance.

Others in the prior art have used a solution of ammonium sulfate to plug or seal lead compounds within a slitted vulcanized rubber tube. This was necessary because the lead components within the rubber tube were very fine and would leak out of the slit. This would result in the loss of a valuable component which had to be removed from the workplace and would result in a nonuniform product.

Therefore, it is an object of this invention to provide a system which overcomes the aforementioned inadequacies of the prior art and provides an improvement which is a significant contribution to the advancement of the pertinent art.

Another object of the present invention is to provide an improved process of reducing lead dust emanating from pasted plates during lead acid battery manufacturing procedures.

Another object of the present invention is to produce an improved coated lead acid battery plate with a low dusting characteristic and without substantially altering electrical performance.

Another object of the present invention is to provide an improved coating composition suitable for coating pasted lead-acid battery plates.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the detailed description describing the preferred embodiment in addition to the scope of the invention defined by the claims.

SUMMARY OF THE INVENTION

The method of reducing lead dust generated in the manufacture of lead acid storage batteries is defined by the appended claims. For the purpose of summarizing the invention, the invention relates to a method of reducing lead dust generated in a known manufacture of lead-acid storage batteries, including pasting and supporting a grid with a lead paste material and applying to the pasted grid a dust-suppressing porous film forming amounts of a coating material or the like. The invention also relates to a substantially dust-free unformed leaded plate for a lead-acid storage battery or the like. This method reduces the generation of lead dust in battery manufacturing, thereby improving the air quality in the work place. Furthermore, the invention also relates to a composition which reduces lead dust emanating from the lead plates during the process of manufacturing lead-acid storage batteries or the like and which further provides a porous coating on the surface of the storage battery plates, so as not to inhibit performance.

The method of reducing lead dust generated in the known manufacture of lead-acid storage batteries comprises pasting a support grid with a lead paste material and applying to the pasted grid a dust-suppressing porous film, forming amounts of the coating material. The coating material includes ammonium sulfate, a copolymer emulsion, water, and further includes drying the coating material to provide a water-insoluble porous film.

In a more specific embodiment of the invention, the copolymeric emulsion includes monomeric units of acrylate, styrene and acrylic acid, styrene and butadiene, alpha olefin monomers and vinyl acetate, butyl acrylate, acrylinitrile and methylolacrylamide, butyl acrylate, methacrylate and methacrylic acid. The copolymeric emulsion is selected from the group consisting of Vinacryl 7172, Vinamul 6705, Dur O Cryl 620 and Stythemul DL 2519. More specifically, the copolymeric emulsion is either Vinacryl 7172 or Vinamul 6705 or Dur O Cryl 620 or Synthemul DL 2519.

More specifically, the method of suppressing lead dust generated in the known manufacture of lead acid storage batteries includes the steps of applying to a pasted plate an aqueous dispersion of a copolymeric emulsion and ammonium sulfate. The ammonium sulfate reacts with the lead oxide of the pasted plate to produce gaseous ammonia. The method of the present invention further includes drying the pasted plate to provide a substantially dust-free pasted plate with a water insoluble copolymeric porous film thereon.

More specifically, the alternative method of the present invention includes a copolymeric emulsion comprising monomeric units of acrylate, styrene and acrylic acid, styrene and butadiene, alpha olefin monomers and vinyl acetate, butyl acrylate, acrylonitrile and methylolacrylamide, butyl acrylate, methacrylate and methacrylic acid. The copolymeric emulsion is selected from the group consisting of Vinacryl 7172, Vinamul 6705, Dur O Cryl 620 and Synthemul DL 2519. Alternatively, the copolymeric emulsion is either Vinacryl 7172 or Vinamul 6705 or Dur O Cryl 620 or Synthemul DL 2519.

Additionally, the present invention includes a substantially dust-free unformed leaded plate for lead-acid storage batteries, the lead pasted supporting grid being coated with a copolymeric water insoluble porous coating which is rendered porous by applying a suspension of copolymer emulsion, ammonium sulfate and water.

More specifically, the copolymeric emulsion comprises monomeric units of acrylate, styrene and acrylic acid, styrene and butadiene, alpha olefin monomers and vinyl acetate, butyl acrylate, acrylonitrile and methalolacrylamide, butyl acrylate, methacrylate and methacrylic acid. The copolymeric emulsion is selected from the group consisting of Vinacryl 7172, Vinamul 6705, Dur O Cryl 620 and Synthemul DL 2519. Alternatively, the copolymeric emulsion is either Vinacryl 7172 or Vinamul 6705 or Dur O Cryl 602 or Synthemul DL 2519.

The present invention further includes a composition which reduces lead dust emanating from the lead plates during the process of manufacturing lead-acid storage batteries and which further provides a porous coating on the surface of the plates. The composition includes ammonium sulfate, copolymeric emulsion, and water. More specifically, the copolymeric emulsion comprises monomeric units of acrylate, styrene and acrylic acid, styrene and butadiene, alpha olefin monomers and vinyl acetate, butyl acrylate, acrylonitrile and methylolacrylamide, or butyl acrylate, methacrylate and methacrylic acid. The composition is selected from the group consisting of Vinacryl 7172, Vinamul 6705, Dur O Cryl 620 and Synthemul DL 2519. Alternatively, the composition includes a copolymer emulsion comprising either Vinacryl 7172 or Vinamul 6705 or Dur O Cryl 620 or Synthemul DL 2519.

The foregoing has outlined rather broadly the more pertinent and important features of the present invention in order that the detailed description that follows may be better understood so that the present contribution of the art can be fully appreciated. Additionally, features of the invention will be described hereinafter which form the subject of the claims of the invention. It should be appreciated by those skilled in the art that the conception and the specific embodiment disclosed may be readily utilized as basis for modifying or designing other devices for carrying out the same purposes of the present invention. It should also be realized by those skilled in the art that such equivalent constructions do not depart from the spirit and scope of the invention as set forth in the independent claims.

DETAILED DESCRIPTION

The invention comprises a method of suppressing lead dust generated by the manufacture of lead-acid batteries without substantially interfering with battery performance, i.e., no cycling is required. By cycling is meant no charge-discharge cycles are required to attain maximum battery output. A specific example of the invention includes the method of suppressing lead dust generated during manufacture by applying an aqueous suspension of a copolymer and ammonium sulfate to the surface of a pasted plate and flash drying at temperatures of from 350° F. to 725° F.

It has been discovered that mixing ammonium sulfate with an aqueous copolymer emulsion and applying the resultant mixture to unformed battery plates results in a porous film which not only reduces the amount of lead dust emanating from the coated plates but also reduces the electrical resistance of the film. It has been suggested that the porous nature of the film is due to the reaction of ammonium sulfate with lead oxide to produce gaseous ammonia:

$$H_2O + PbO + (NH_4)_2SO_4 \rightleftharpoons PbSO_4 + NH_4OH$$
$$NH_4OH \rightleftharpoons NH_3 + H_2O$$

This is, however, a theoretical explanation and the present specification is not to be bound by this theoretical explanation.

The true pore volume is difficult to estimate as not all of the ammonium sulfate available would necessarily react within the polymer matrix. The maximum porosity that the ammonium sulfate could impart would be 47 percent, assuming the pore volume is directly relatable to the total ammonium sulfate concentration available.

A significant amount of the lead oxide dust made airborn from dry unformed plates is thought to be generated as the plates are stacked into groups and as the assembled elements are dropped into the battery container. The stacking and assembly process can best be simulated by plate vibration. Accordingly, a method was devised that would vibrate a plate and collect the resultant airborn dust.

A small vibrating table was constructed with a dished surface to contain a dry unformed (DUF) plate during vibration. A closure box 15 inches square on each side was constructed to contain the vibrator and the plate to collect all lead dust emitted during the vibratory process. A vacuum pump and filter assembly was used to collect the airborn dust from the closure box. The filter was 50 mm in diameter with an 0.45 micron pore diameter. The vacuum pump was capable of drawing approximately 20 liters of air per minute and was connected through the filter to the closure box. The filter was located 6 inches above the battery plate. The vibrator oscillated at 1800 cycles per minute with an amplitude that was variable from 0 to 0.075 inch. The optimum amplitude was found to be 60% of the maximum or an estimated 0.04 inch. Higher amplitudes would dislodge paste pellets from a significant percentage of the DUF plates. Puffs of dust were visible as the pellets broke loose and the individual pellets emitted dust until the pellet would bounce off the vibration table. Each plate was vibrated for 15 minutes during which time approximately 300 liters of air was drawn through the 50 mm filter. The filter was weighed before and after each test. The amount of dust collected was averaged for each coating thickness and compared.

Table 1 illustrates the results for coated plates:

TABLE 1

| PLATE DUSTING MEASUREMENTS | | | | | | |
|---|---|---|---|---|---|---|
| | Film Thickness (Calculated), Microns | | | | | |
| Dust Collected | 0 | 4 | 6 | 8 | 10 | 12 |
| Avg. mg/15 min. | 19.5 | 1.6 | 1.5 | 1.2 | 0.9 | 1.1 |
| Std. Deviation | 15.7 | 1.0 | 0.9 | 0.9 | 0.7 | 1.2 |

A laboratory coating was mixed to the Paint Research Association formulation of 3/4/20 pbwt (ammonium sulfate/copolymer emulsion (DL 2519)/water). A dry, unformed (DUF) plate was suspended from the underpan arm of a digital balance. The balance was set on top of a small spray booth with the weighing hook protruding through a 0.25 inch hole. After the dry unformed (DUF) plate was attached to the hook, the balance was tared and a precise amount of a thin coating was uniformly applied to each side of the plate with the weight being noted from the balance. The thin coating was applied as a spray from a one-point aerosol spray bottle. The coated plates were then allowed to air dry suspended under the laboratory hood.

The dust measurements as set forth above were conducted for the thin coated plates and showed a marked reduction in plate dustiness compared to Table 1. A 4 micron (47% porous) film thickness reduced the dust collected by 92% compared to a non-coated plate (Table 1) while a 10 micron (47% porous) coating reduced the dust by 95%.

The suspension of the present invention is water based and comprises ammonium sulfate, copolymer emulsion and water, with any necessary surfactants. Generally non-ionic and/or anionic surfactants are used in the coating. The relative amounts (parts by weight) are approximately 2–3:4:20, ammonium sulfate/copolymer emulsion/water. The resultant proportion can be determined by one skilled in the art depending on the copolymer and surfactant system selected by the user.

It should be appreciated by those skilled in the art that a salt, such as ammonium sulfate, will destabilize an emulsion resulting in separation or coagulation into a solid form which will not remain in suspension.

Copolymers embraced in the present coating are prepared from the following monomeric units: styrene, acrylate and acrylic acid; styrene and butadiene; alpha olefin monomers and vinyl acetate; butyl acrylate, acrylonitrile and methylolacrylamide; butyl acrylate, methacrylate and methacrylic acid. Any film forming copolymeric system that results in a water insoluble film that does not substantially affect electrical output when applied in a manner consistent with this disclosure is considered to be within the scope of this invention.

The only limitation is that a latex polymer (emulsion) must be used since a latex will consolidate in discrete particles, whereas solution polymers film form over the salt, blocking the required salt and lead oxide reaction.

A number of commercial copolymeric lateces have been formulated:

1. Vinacryl 7172 is a polymer composed of acrylate, 40 percent styrene, 5 percent acrylic acid emulsified with a 3 percent non-ionic surfactant system to give a 50% solids latex. This formulation will tolerate up to 15 percent ammonium sulphate without loss of mechanical stability. Vinacryl is manufactured by Vinyl Products.

2. Vinamul 6705 is a polymer composed of 90 percent vinyl acetate and 10 percent alpha olefin monomers emulsified with 4 percent non-ionic surfactant to yield a 50 percent solids latex. The formulation will tolerate up to 10 percent ammonium sulphate. Vinamul 6705 is manufactured by Vinyl Products.

3. Dur O Cryl 620 is a polymer composed of 77½ percent butyl actylate, 20 percent acrylonitrile and 2½ percent methylolacrylamide emusified with 4.0 percent non-ionic and 0.15 percent anionic surfactants to make a 40 percent solids emulsion. As commercially sold this polymer would not tolerate 5 percent ammonium sulphate without first adding 3 percent, based on the emulsion, of triton X-100, a common commercial non-ionic surfactant, to the Dur O Cryl 620. Even this post addition of surfactant did not prevent Dur O Cryl 620 from coagulating upon storage. Dur O Cryl 620 is self-crosslinking (via the methlolacrylamide) and this can be further assisted by post additions of up to 1 percent p-toluene sulfonic acid. (This polymer, because of its more durable composition and resistance to battery acid, exhibits the additional property of reducing lead shedding and prolonging plate life when used in invented formulation.) Dur O Cryl is manufactured the National Starch Company.

4. Synthemul DL 2519 is a polymer composed of 49 percent butyl acrylate, 49 percent methacrylate and 2 percent methacrylic acid emulsified with 3½ percent non-ionic and ½ percent anionic surfactants to produce a 49 percent solids emulsion. DL 2519 tolerates 10 percent ammonium sulphate. Although RCI manufactures approximately 25 commercial latices, it had none that would tolerate 10% additions of ammonium sulfate. RCI created DL 2519 just for this purpose. The "DL" designation stands for "Dover Labs" to register this as a laboratory specialty rather than for broad commercial applications. Synthemul DL 2519 is manufactured by Reichhold Chemical Company.

It was noted that latices 1 and 4, which contained acid functional monomers, demonstrated improved mechanical stability when the pH of the ammonium sulphate solution was first adjusted to 8 or 9 prior to adding the latex. It is presumed that is due to the latex being partially solubolized, hence improved stability, particularly when being sprayed.

The most convenient application system was spraying the suspension directly onto the plates just prior to the flash drying oven. The temperature setting for uncoated plates varies from 200° F. to 275° F., while the coated plates require temperature settings of 350° F. to 725° F., the higher temperatures for the thicker coatings. The 725° F. setting was required for 10 micron and thicker coatings. This temperature is dangerously high as it is on the verge of melting or crystallizing the grid lugs.

The dispersion can also be applied to the surface of the plates by immersing the plates into a bath of the dispersion, by brushing or by rolling.

In order to test the electrical resistance the coating imparts, battery performance was evaluated. A total of 262 batteries were assembled. The following table depicts the various types and quantities.

TABLE 2

|  | Wet Antimony | Wet Calcium | Dri-Active | Dry Charged |
|---|---|---|---|---|
| Non-coated | 16 | 14 | 16 | 8 |
| 2 microns | 16 | 15 | 16 | 8 |
| 6 microns | 15 | 15 | 16 | 8 |
| Doped 6 microns | 15 | 14 | — | — |
| 10 microns | 16 | 16 | 16 | 8 |

Plus 14 assorted dry unformed.

The batteries were 12 volt, BCI group 24 with 11 plates per element. Assembly was accomplished on a Farmer automatic cast-on, through the wall connections and heat-seal cover.

BATTERY TEST RESULTS

Three batteries from each category were selected at random for initial tests. The test sequence was the standard BCI schedule of cold activation, reserve capacity and cold performance.

After three months of storage another three batteries from each category were selected at random for the same tests. In addition, 8 batteries were placed on the SAE J240 cycle life test. Four of the maintenance-free batteries were tested for gas evolution using the Ford Motor Company method. An additional ten dry unformed batteries were formed and tested after 3 months of dry store.

The following tables summarize the test results.

TABLE 3

INITIAL TEST RESULTS

|  |  | Not Coated | 2 Micron | 6 Micron | Doped 6 Micron | 10 Micron |
|---|---|---|---|---|---|---|
| Wet Antimony | RCT, minutes | 100.5 | 107.5(+7.5%) | 110.6(+10%) | 104.9(+4.3%) | 101.8(+1.3%) |
|  | CCA, amps | 358.8 | 382.2(+6.5%) | 354.9(−1.1%) | 358.1(−0.2%) | 353.7(−1.4%) |
| Wet Calcium | RCT, minutes | 96.7 | 95.3(−0.1%) | 91.0(−5.8%) | 91.1(−5.8%) | 95.2(−1.6%) |
|  | CCA, amps | 388.5 | 383.4(−1.3%) | 383.6(−1.3%) | 378.1(−2.7%) | 354.4(−8.8%) |
| Dri-Active | ACT, 15 sec V | 8.86 | 8.94(+0.1%) | 8.83(−0.3%) | — | 8.76(−1.1%) |
|  | RCT, minutes | 105.9 | 110.1(+3.9%) | 105.1(−0.7%) | — | 107.0(+1.0%) |
|  | CCA, amps | 369.2 | 376.1(+1.9%) | 358.4(−2.9%) | — | 348.2(−5.7%) |
| Dry Charged | ACT, 15 sec V | 3.02 | 3.04(+0.6%) | 1.52(−49.6%) | — | 2.57(−14.9%) |
|  | RCT, minutes | 92.8 | 94.8(+2.2%) | 95.8(+3.2%) | — | 95.1(+2.5%) |
|  | CCA, amps | 360.6 | 344.4(−4.5%) | 349.6(−3.1%) | — | 338.1(−6.2%) |

Averages are based on the best results from each battery.

TABLE 4

3-MONTH STORAGE TEST RESULTS

|  |  | Not Coated | 2 Micron | 6 Micron | Doped 6 Micron | 10 Micron |
|---|---|---|---|---|---|---|
| Wet Antimony | RCT, minutes | 103.2 | 105.0(+1.7%) | 108.6(+5.2%) | 110.0(+6.6%) | 103.4(+0.2%) |
|  | CCA, amps | 353.3 | 367.5(+4.0%) | 354.2(+0.3%) | 361.8(+2.4%) | 334.5(−5.3%) |
| Wet Calcium | RCT, minutes | 98.7 | 92.9(−5.9%) | 91.9(−6.9%) | 94.0(−4.8%) | 91.2(−7.6%) |
|  | CCA, amps | 394.9 | 391.6(−0.8%) | 382.9(−3.0%) | 382.2(−3.2%) | 381.3(−3.4%) |
| Dri-Active | ACT, 15 sec V | 5.53 | 8.45(+53%) | 7.18(+30%) | — | 8.10(+46%) |
|  | RCT, minutes | 102.4 | 105.7(+3.2%) | 110.8(+8.2%) | — | 120.5(18%) |
|  | CCA, amps | 343.9 | 379.6(+10%) | 343.2(−0.2%) | — | 350.2(+18%) |
| Dry Charged | ACT, 15 sec V | 2 | 2 | 2 | — | 2 |
|  | RCT, minutes | 92.0 | 91.7(−0.3%) | 92.0(0%) | — | 93.6(+1.7%) |
|  | CCA, amps | 369.0 | 356.0(−3.5%) | 348.8(−5.4%) | — | 327.5(−11%) |

TABLE 5
3-MONTH STORAGE DRY UNFORMED TEST RESULTS

| | | Not Coated | 2 Micron | 6 Micron | 10 Micron |
|---|---|---|---|---|---|
| Wet Antimony | RCT, minutes | 102.5 | 104.4(+1.8%) | 100.4(−2.0%) | 97.8(−4.6%) |
| | CCA, amps | 356.4 | 386.0(+8.3%) | 351.6(−1.3%) | 361.0(+1.3%) |
| Wet Calcium | RCT, minutes | 100.7 | 95.7(−5.0%) | — | 97.3(−3.4%) |
| | CCA, amps | 415.7 | 414.7(−02.5) | — | 373.5(−10%) |

TABLE 6
CYCLE LIFE AND MF GASSING TEST RESULTS

| | | Not Coated | 6 Micron | Doped 6 Micron | 10 Micron |
|---|---|---|---|---|---|
| J240 Cycle Life Cycles | Wet Antimony | 2380 | 2224 | 3274 | 2427 |
| | Wet Calcium | 3556 | 2647 | 2397 | 1819 |
| Gassing | Wet Calcium | .0076 | .0088 | .0056 | .0081 | cc's gas/minutes/ml electrolyte

There was a large amount of scatter in the test data. This was thought to be caused by erratic coating and was most noticeable at the 10 micron coating level. The 10 micron coating was in general the lowest performer of the coated plates. Surprisingly, in most instances the coated antimonial plates performed better than the non-coated plates. This is thought to be related to the plate moisture content at the beginning of the hydroset process. At one point the non-coated plates had an 8% moisture content while the coated plates (6 micron) had a 9% moisture content. This was not true with the calcium plates where the non-coated plates had the best performance. In most cases the 2 micron coating gave the best performance of the coated plates. The doped negative paste appears to have had little effect on performance, as most of the data was very close to the 6 micron coating without doped negatives.

The dri-active activations initially were effected only slightly by the coatings, but after 3 months of storage the coatings appear to have improved the battery activation results. The dry charged activations were all inferior for both the coated or non-coated plates. This result is thought to be caused by excessive negative plate oxidation during the dry charged process.

A statistical analysis of the coated battery test data was conducted to determine the significance of data compared with the non-coated control test data. A normal range of ±3% was assumed for the control test results, and the coated plate results were compared to this range. The following tables are this comparison using a confidence level of 95%.

TABLE 13
STATISTICAL ANALYSIS OF ACTIVATION TEST DATA
Variation From Non-Coated Results
Coating Level; 47% Porosity

| | 2 Microns | 6 Microns | 10 Microns |
|---|---|---|---|
| Initial Tests | | | |
| Dri-active | N | N | N |
| Dry Charged | N | D | D |
| After 3 Months | | | |
| Dri-active | I | I | I |
| Dry Charged | N | N | N |

N = no significant change;
D = decreased;
I = increased

TABLE 14
STATISTICAL ANALYSIS OF RESERVE CAPACITY
Variation From Non-Coated Results
Coating Level; 47% Porosity

| | 2 Microns | 6 Microns | Doped 6 Microns | 10 Microns |
|---|---|---|---|---|
| Initial Tests | | | | |
| Wet Antimony | N | N | N | N |
| Wet Calcium | N | N | N | D |
| Dri-active | N | N | — | N |
| Dry Charged | N | N | — | D |
| After 3 Months | | | | |
| Wet Antimony | N | N | N | D |
| Wet Calcium | N | N | N | N |
| Dri-active | N | N | — | N |
| Dry Charged | N | D | — | D |
| 3 Month DUF Storage | | | | |
| Wet Antimony | I | — | N | N |
| Wet Calcium | N | — | — | D |

N = no significant change;
D = decreased;
I = increased

As discussed and illustrated above, the use of the ammonium sulfate containing aqueous copolymeric dispersion to apply a water-insoluble porous coated battery plate not only reduces the level of airborne lead dust, but also, surprisingly, does not substantially affect the electrical performance of batteries prepared from the coated plates.

As will be apparent to those skilled in the art, copolymeric emulsions specifically mentioned above are merely illustrations and are not to be construed as limitations on the scope of the disclosed invention but, rather, that the scope of the invention is as defined in the claims which follow.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of reducing lead dust generated in the known manufacture of lead-acid storage batteries comprising pasting a supporting grid with a lead paste material and applying to the pasted grid a dust suppressing porous film forming amounts of a coating material comprising:
   ammonium sulfate;
   a copolymer emulsion;
   water; and
   drying said coating material to result in a water-insoluble porous film.

2. The method of claim 1 wherein the copolymeric emulsion comprises the following monomeric units:

acrylate, styrene and acrylic acid; styrene and butadiene; alpha olefin monomers and vinyl acetate; butyl acrylate, acrylonitrile and methylolacrylamide; butyl acrylate, methacrylate and methacrylic acid.

3. The method of claim 1 wherein the copolymeric emulsion is selected from the group consisting of: Vinacryl 7172, Vinamul 6705, Dur O Cryl 620 and Stythemul DL 2519.

4. The method of claim 1 wherein the copolymeric emulsion is Vinacryl 7172.

5. The method of claim 1 wherein the copolymeric emulsion is Vinamul 6705.

6. The method of claim 1 wherein the copolymeric emulsion is Dur O Cryl 620.

7. The method of claim 1 wherein the copolymeric emulsion is Synthemul DL 2519.

8. A method of suppressing lead dust generated in the known manufacture of lead-acid storage batteries comprising applying to a pasted plate an aqueous dispersion of a copolymeric emulsion and ammonium sulfate;
said ammonium sulfate reacting with the lead material of the pasted plate to produce gaseous ammonia;
drying said pasted plate to result in a substantially lead dust-free pasted plate with a water insoluble copolymeric porous film thereon.

9. The method of claim 8 wherein the copolymeric emulsion comprises the following monomeric units: acrylate, styrene and acrylic acid; styrene and butadiene; alpha olefin monomers and vinyl acetate; butyl acrylate, acrylonitrile and methylolacrylamide; butyl acrylate, methacrylate and methacrylic acid.

10. The method of claim 8 wherein the copolymeric emulsion is selected from the group consisting of: Vinacryl 7172, Vinamul 6705, Dur O Cryl 620 and Synthemul DL 2519.

11. The method of claim 8 wherein the copolymeric emulsion is Vinacryl 7172.

12. The method of claim 8 wherein the copolymeric emulsion is Vinamul 6705.

13. The method of claim 8 wherein the copolymeric emulsion is Dur O Cryl 620.

14. The method of claim 8 wherein the copolymeric emulsion is Synthemul DL 2519.

15. A substantially dust free unformed leaded plate for lead acid storage batteries comprising a lead pasted supporting grid coated with a copolymeric water insoluble porous coating made porous by applying a suspension of copolymer emulsion, ammonium sulfate and water.

16. The leaded plate of claim 15 wherein the copolymeric emulsion comprises the following monomeric units: acrylate, styrene and acrylic acid; styrene and butadiene; alpha olefin monomers and vinyl acetate; butyl acrylate, acrylonitrile and methylolacrylamide; butyl acrylate, methacrylate and methacrylic acid.

17. The leaded plate of claim 15 wherein the copolymeric emulsion is selected from the group consisting of: Vinacryl 7172, Vinamul 6705, Dur O Cryl 620 and Synthemul DL 2519.

18. The leaded plate of claim 15 wherein the copolymeric emulsion is Vinacryl 7172.

19. The leaded plate of claim 15 wherein the copolymeric emulsion is Vinamul 6705.

20. The leaded plate of claim 15 wherein the copolymeric emulsion is Dur O Cryl 620.

21. The leaded plate of claim 15 wherein the copolymeric emulsion is Synthemul DL 2519.

22. A composition which reduces lead dust emanating from lead plates during the process of manufacturing lead-acid storage batteries comprising:
ammonium sulfate;
copolymeric emulsion wherein the monomeric units of the copolymeric emulsion are selected from the group consisting of: acrylate, styrene and acrylic acid; styrene and butadiene; alpha olefin monomers and vinyl acetate; butyl acrylate, acrylonitrile and methylolacrylamide; or butyl acrylate, methacrylate and methacrylic acid; and
water.

23. The composition of claim 22 wherein the copolymeric emulsion is selected from the group consisting of Vinacryl 7172, Vinamul 6705, Dur O Cryl 620 and Synthemul DL 2519.

24. The composition of claim 22 wherein the copolymer emulsion comprises Vinacryl 7172.

25. The composition of claim 22 wherein the copolymer emulsion comprises Vinamul 6705.

26. The composition of claim 22 wherein the copolymer emulsion comprises Dur O Cryl 620.

27. The composition of claim 22 wherein the copolymer emulsion comprises Synthemul DL 2519.

* * * * *